July 14, 1970  H. D. BLACKBURN  3,520,433
TRUCK-TRACTOR CHASSIS AND DETACHABLE CONTAINER CHASSIS
Filed Aug. 23, 1968  3 Sheets-Sheet 1

INVENTOR
HORACE D. BLACKBURN
BY *Semmes and Semmes*
ATTORNEYS

July 14, 1970   H. D. BLACKBURN   3,520,433
TRUCK-TRACTOR CHASSIS AND DETACHABLE CONTAINER CHASSIS
Filed Aug. 23, 1968   3 Sheets-Sheet 2
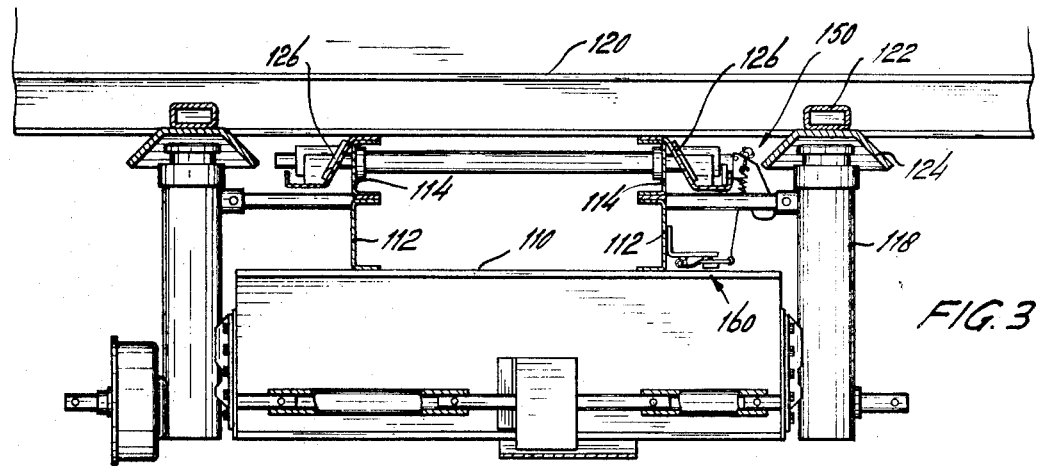
FIG. 3
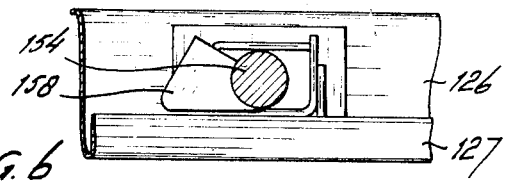
FIG. 6
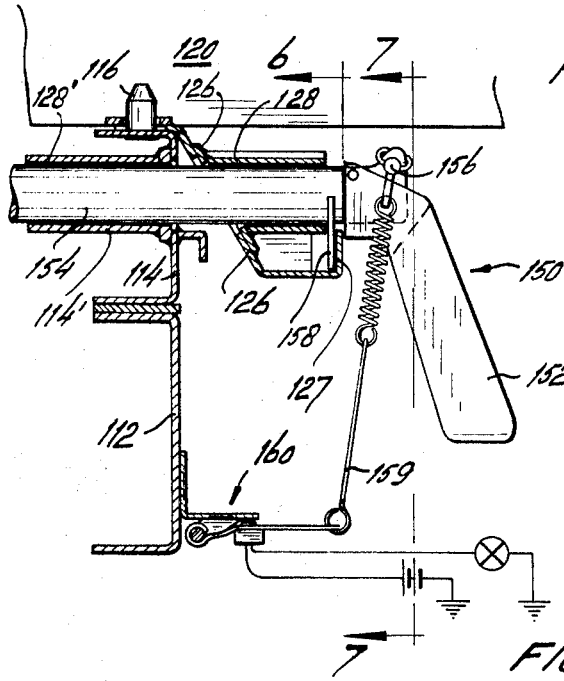
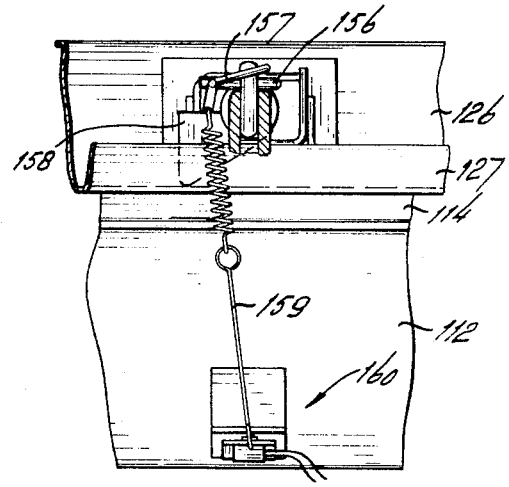
FIG. 7
FIG. 4
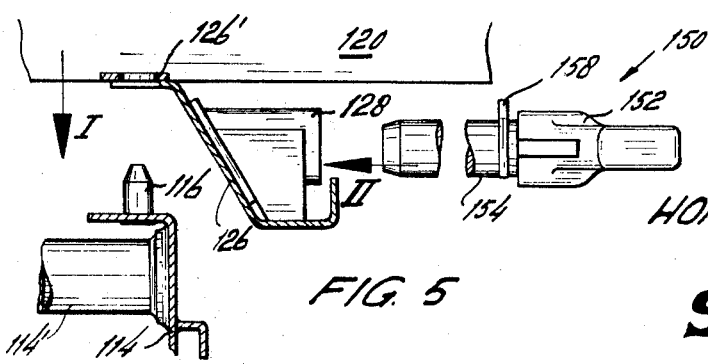
FIG. 5
INVENTOR
HORACE D. BLACKBURN
Semmes and Semmes
ATTORNEYS July 14, 1970  H. D. BLACKBURN  3,520,433
TRUCK-TRACTOR CHASSIS AND DETACHABLE CONTAINER CHASSIS
Filed Aug. 23, 1968  3 Sheets-Sheet 3

INVENTOR
HORACE D. BLACKBURN

*Semmes and Semmes*

ATTORNEYS

United States Patent Office 3,520,433
Patented July 14, 1970

3,520,433
TRUCK-TRACTOR CHASSIS AND DETACHABLE CONTAINER CHASSIS
Horace D. Blackburn, Bradenton, Fla., assignor to Miller Trailers, Inc., Bradenton, Fla., a corporation of Florida
Filed Aug. 23, 1968, Ser. No. 754,768
Int. Cl. B60p 1/64
U.S. Cl. 214—515                 5 Claims

ABSTRACT OF THE DISCLOSURE

In combination with truck-tractor chassis having detachable container chassis, a system whereby the container chassis may be readily detached, semi-automatically from the truck chassis for temporary storage following long distance hauling and pickup or local hauling. The system includes automatic means for raising and lowering the container chassis above the truck chassis; for centering same; for locking same; as when the container chassis has been positioned for re-conveyance.

BACKGROUND OF THE INVENTION

Field of the invention

Whereas the invention is defined with respect to truck chassis and container chassis, as shown, it will be obvious to those skilled in the art that the same or similar system may be applied to tractor driven rigs as, for example, semi-tractor-trailer combination and the like.

Description of prior art

There has been a considerable amount of development in the area of vehicular truck container removal and temporary storage. Outstanding in this field are the following United States Patents: Norris et al., 2,958,538; Thiele, 3,362,552; Scoby, 2,808,289; Katz, 3,211,313; Powell, 3,231,121; Herpich et al., 3,119,503; Stringfellow, 2,847,-137; Proler et al., 3,255,906; Hand, 3,332,661.

SUMMARY OF THE INVENTION

Whereas in the prior art, there have been defined numerous means for freight transporting, using retractible lifting mechanism from truck bed to engage container chassis and as well, means for locking the respective container and truck elements together for transport, a novel system ensuring accuracy in alignment in positioning for transport and for locking the respective truck bed and container supporting floor into position have not yet been satisfactorily devised. Nor have sufficient safety precautions been devised to ensure that the respective truck bed and container bottom may be securely fastened with appropriate signals to the driver to ensure a safe interlocking thereof.

It is to these critical features of accurate alignment and safe interlocking that the present invention is primarily directed and too, the invention, whereas described in connection with truck-tractor chassis and detachable container chassis is equally adaptable to semi-trailer chassis.

BRIEF DESCRIPTION OF THE DRAWINGS

FIG. 3 is a fragmentary sectional view of invention taken along the lines 3—3 of FIG. 1;
FIG. 4 is a fragmentary vertical sectional view of invention taken along the lines 4—4 of FIG. 1;
FIG. 5 is likewise a fragmentary sectional view of the FIG. 4 locking mechanism, showing the unlocked position of the lock bar;
FIG. 6 is a fragmentary sectional view of invention taken along the lines 6—6 of FIG. 4;
FIG. 7 is a fragmentary sectional view of invention taken along the lines 7—7 of FIG. 4.

DESCRIPTION OF THE PREFERRED EMBODIMENTS

Figure 8:
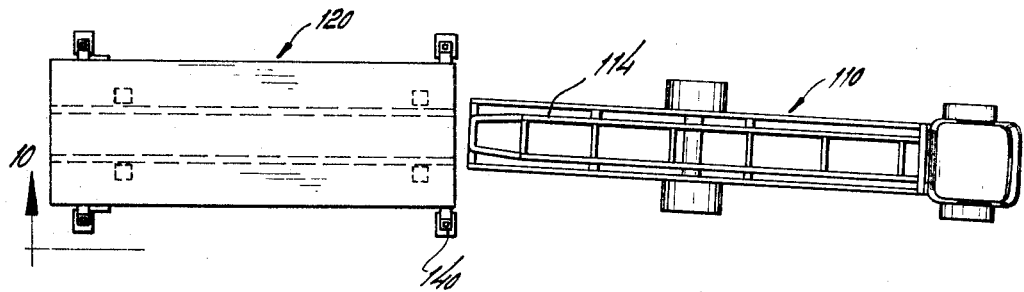
FIG. 8 is a top plan view of invention showing the truck-tractor and container chassis with the latter in storage and the former attempting recovery and
FIG. 9 is a side elevational view thereof.
Figure 9:
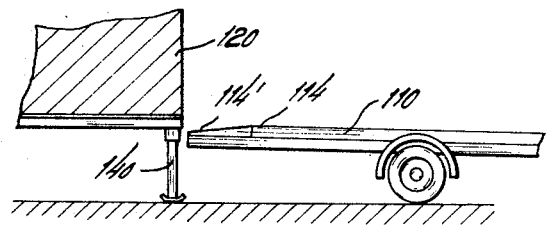

The truck-container unit is designated 100, the truck-tractor chassis being represented at 110 and containing longitudinal beams 112 with superposed raceways 114, fixedly attached. With reference to FIGS. 3, 8, and 9, it will be noted that the raceways 114 extend parallel to the truck bed per se, and inwardly thereof, terminating in a sloping portion 114'. These raceways are adapted to close fit with the corresponding guides 126, best shown in FIG. 3. The guides 126 are accurately spaced at the bottom of the container 120. In practice, the centering projection 116 of guides 114 is sufficiently beneath the container 120 during the course of positioning of the truck bed that it avoids contact therewith and until such time as the container is dropped by action of the lifters 118 hereinafter described. See, in this connection, FIGS. 4 and 5 illustrating the corresponding protrusion 116 of the truck and the centering aperture 126' of the container 120. It will be appreciated that in practice, the location of the respective channel 114' for the locking member 154 and the centering projection 116 is quite critical to successful application of the principles involved herein. See, for example, the location of the recess 126' with respect to the channel 114', best illustrated in FIG. 5.

Figure 1:
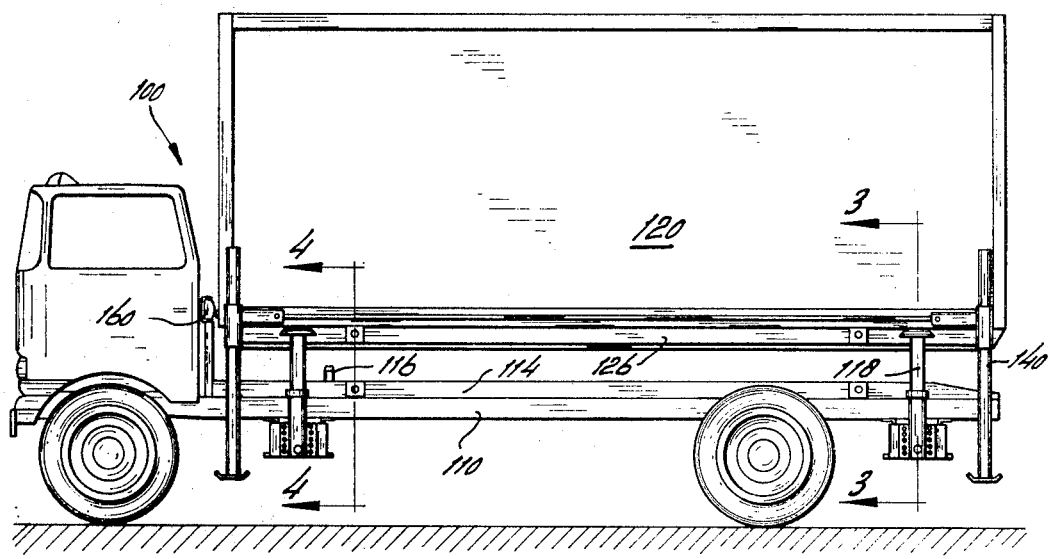
FIG. 1 is a view in side elevation of invention.
Figure 2:
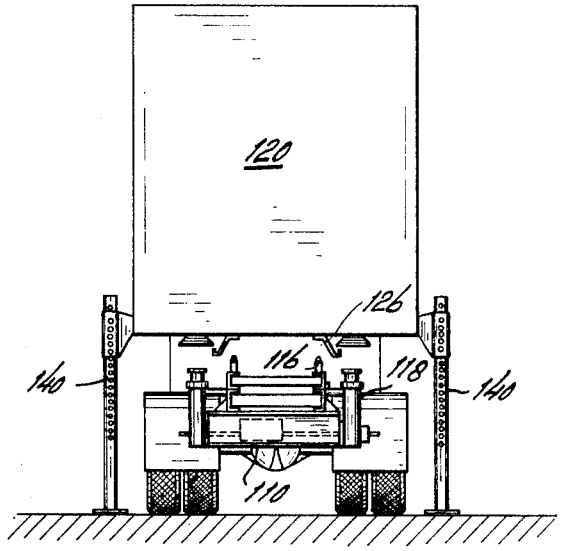
FIG. 2 is a rear end elevational view thereof.
Figures 10, 11:
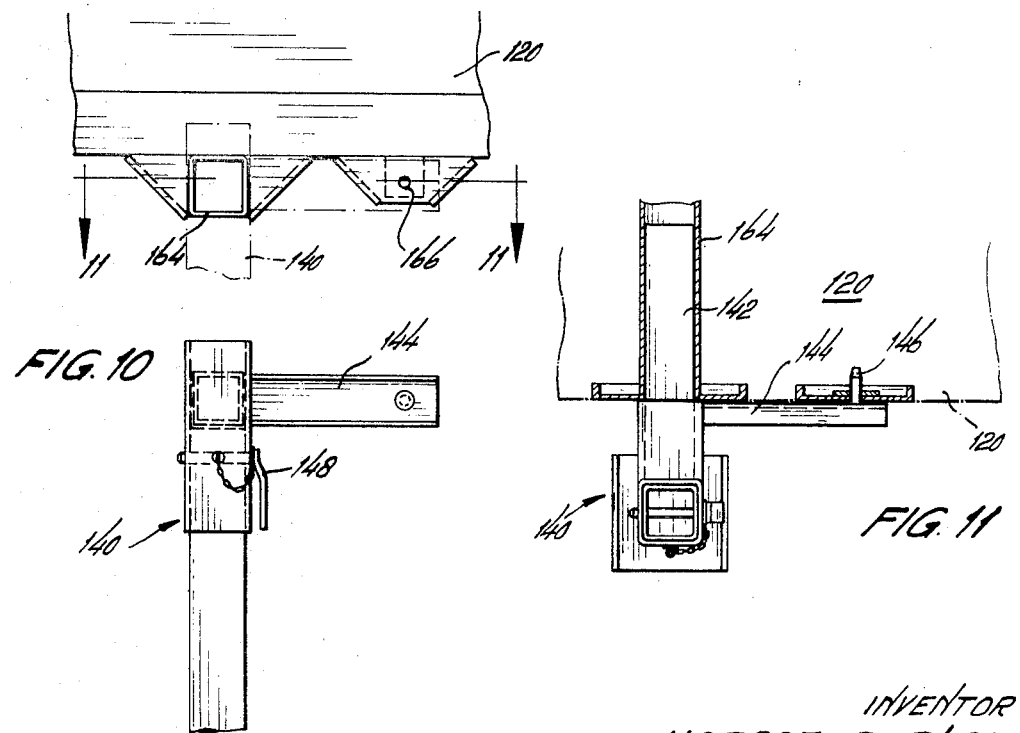
FIG. 10 illustrates the container chassis storage support in side elevation.
FIG. 11 illustrates a fragmentary sectional view of the support and container structure illustrated in FIG. 11, taken along the lines 11—11 thereof, this being a horizontal sectional view thereof.

In FIGS. 1 and 2, the container 120 is raised above the truck chassis 110 initially, as in FIG. 1, in preparation for disassociation of the truck chassis from the container chassis as in FIG. 2. The mechanism by which this is accomplished is best illustrated in FIG. 3 and in partial detail in FIGS. 10 and 11. With reference to FIG. 3, it will be noted that the power driven piston means housed at 118 is adapted to engage corresponding container chassis bearing cups 124, said cups bearing against the frame element 122 of the container chassis and on signal, the four container chassis lifting components 118 simultaneously lift the container chassis sufficiently to clear all of the alignment elements such as the pin 116, clearance being effected as in FIG. 5, reference the aperture 126 in the container chassis 120. Here, and in disassociation of the container 120, from the truck bed 110, the extensible supports 140 are appropriately removed from the horizontal housings 164; set upright as in FIG. 10 and inserted again in the housings, the extension and supporting arm 142 engaging the recess 164 for support, its corresponding stabilizer arm 144 engaging by means of the stabilizer protrusion 146 the aperture 166, best shown in FIG. 10.

Assuming now that the truck chassis is being moved into position for pickup of the container, reference FIGS. 8 and 9, it is important to consider the various means by which proper orientation of the truck chassis may be effected to compensate for driver errors in placement. Describing the means by which the container chassis is physically forced into universal alignment with the truck chassis as the former is lifted off the supporting posts 140, the posts are removed and the container chassis lowered by means of the extended and retractable piston elements 118. From the position shown in FIG. 5 to the position shown in FIG. 4 there is automatic alignment of the protrusion 116 of the truck chassis and its corresponding well 126 of the container chassis, insuring thereby that the sleeve elements 128 and 128' of the locking pin are horizontally aligned so that the locking pin 150 may be inserted substantially fully transversely of the respective guides and beams forming corresponding container supporting portions of the truck and container chassis. Thus, insofar as the locking pin housings 126 and 128 and 128' may be concerned, their transverse alignment is insured by mating action of the projection 116 into its recess 126', as mentioned. With reference to FIG. 6, it will be noted that the pistol grip 152 of the locking pin 150 has been rotated arcuately thereby placing the pistol grip in a position which is generally horizontal to the ground and to the respective elements comprising the truck bed and the container guide therefor. This, then disposes the pistol lock plate 158 in a position so that it may clear the locking flange 127 of the guide rail. This clearance of the lock plate 158 is shown in FIG. 5 whereas in FIG. 4, the locking plate 158 is shown to securely engage flange 127 of the guide 126. Now with further reference to the locking mechanism illustrated in FIGS. 4 through 7 inclusive, after the truck has been driven under the container; and electrical energization of the lifting and settling mechanism energized by contact 160, the piston system, now having raised the container as in FIG. 1 and the stationary quadrupods 140 removed and a second vehicle pushed into position, whereupon its corresponding piston systems 118 will, on signal, lower the container onto the truck bed and the locking mechanism 150 is now inserted by the operator and electrical contact is made with an indicator light in the cab of the vehicle such as to maintain a red warning light until such time as the locking shown in FIGS. 4 and 7 is effected, whereby contact is broken, the locking pin 156 having been secured into position and locked therein by the overlying ring 157. The ring is held in position by the spring-loaded connection 159 with the signal system 160, normally closed but upon locking of the system, it is opened to de-energize the warning light cab signal for the driver.

I claim:
1. In combination with cargo vehicle of the type having a removable container associated therewith:
 (A) a truck chassis, and a container chassis adapted for vertical displacement to or from said truck chassis for support thereon or removal therefrom;
 (B) mating and coacting horizontal and vertical container aligning and support means on said truck and container chassis;
 (C) said truck chassis means including transversely spaced guide and support side rails having vertical guides portions and upper horizontally extending container chassis support portions;
 (D) said container chassis means including transversely spaced guide and support side rails having vertically sloping guide portions coactible with said truck chassis rails for horizontal alignment of said truck and container chassis, and additionally having upper horizontally extending portions for superimposed engagement on the support portions of said truck chassis rails for container chassis support on said truck chassis;
 (E) said upper horizontally extending portions of said container chassis rails having respectively an aperture;
 (F) said upper horizontally extending portions of said truck chassis rails having respectively centering and aligning pins thereon engagable in said aperture;
 said truck and container chassis vertical guide portions and said pins being so dimensioned that upon lowering of said container chassis onto said truck chassis, initial mating alignment therebetween results prior engagement of said pins in said apertures for final alignment and seating.

2. The invention according to claim 1, including removable locking means interconnected with the respective truck and container chassis rails to secure the container chassis and the truck chassis against dislocation in transit, said locking means including a guide fixed to and opening through said vertical guide portions of said truck chassis rails, locking rods slidably mounted through said vertically sloping guide portions of said chassis rails, said guide and said rod being transversely disposed and said rod being selectively insertable in said guide.

3. The invention of claim 2, said rod having a locking plate thereon engageable with said container chassis rail for locking coaction therewith, and being disposed for locking engagement or release upon rotation of said rod.

4. The invention of claim 3, and further including selectively attachable tensioning means for said rod for locked positioning of said locking plate.

5. The invention of claim 4, and further including a signalling system associated with said locking means including a normally closed circuit and maintained by the tension connection, and being opened upon locking of said locking means.

References Cited

UNITED STATES PATENTS

| 2,129,340 | 9/1938 | Webber | 214—515 |
| 3,119,503 | 1/1964 | Herpich et al. | 214—515 XR |
| 3,125,965 | 3/1964 | De Penti et al. | |

ALBERT J. MAKAY, Primary Examiner

U.S. Cl. X.R.

296—35